United States Patent
Kanemoto et al.

(10) Patent No.: US 8,280,756 B1
(45) Date of Patent: Oct. 2, 2012

(54) MILESTONE INITIAL SCHEDULING

(75) Inventors: Michael W. Kanemoto, Lawrence, KS (US); Mathew E. Perkins, Pleasant Hill, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1162 days.

(21) Appl. No.: 11/196,692

(22) Filed: Aug. 3, 2005

(51) Int. Cl.
*G06Q 10/00* (2012.01)

(52) U.S. Cl. ..... 705/7.12; 717/101; 705/7.22; 705/7.23; 700/130

(58) Field of Classification Search ............ None
See application file for complete search history.

(56) References Cited

U.S. PATENT DOCUMENTS

| | | | |
|---|---|---|---|
| 5,408,663 A * | 4/1995 | Miller | 718/104 |
| 5,619,695 A * | 4/1997 | Arbabi et al. | 718/100 |
| 5,907,490 A | 5/1999 | Oliver | |
| 5,953,707 A | 9/1999 | Huang et al. | |
| 6,032,121 A * | 2/2000 | Dietrich et al. | 705/7.22 |
| 6,216,109 B1 | 4/2001 | Zweben et al. | |
| 6,519,763 B1 | 2/2003 | Kaufer et al. | |
| 6,678,671 B1 * | 1/2004 | Petrovic et al. | 1/1 |
| 6,687,677 B1 * | 2/2004 | Barnard et al. | 705/7.15 |
| 6,714,915 B1 * | 3/2004 | Barnard et al. | 705/7.13 |
| 6,993,533 B1 * | 1/2006 | Barnes | 1/1 |
| 7,080,024 B2 | 7/2006 | Thompson | |
| 7,089,193 B2 | 8/2006 | Newbold | |
| 7,139,720 B1 * | 11/2006 | Foell et al. | 705/7.22 |
| 7,139,999 B2 | 11/2006 | Bowman-Amuah | |
| 7,222,082 B1 | 5/2007 | Adhikari et al. | |
| 7,222,330 B2 | 5/2007 | Bicknell et al. | |
| 2002/0165742 A1 * | 11/2002 | Robins | 705/7 |
| 2003/0018952 A1 | 1/2003 | Roetzheim | |
| 2003/0083912 A1 | 5/2003 | Covington et al. | |
| 2004/0001103 A1 | 1/2004 | Fliess et al. | |
| 2004/0073467 A1 | 4/2004 | Heyns et al. | |
| 2004/0078254 A1 | 4/2004 | Piechl et al. | |
| 2004/0111306 A1 | 6/2004 | Yokota et al. | |
| 2004/0117046 A1 | 6/2004 | Colle et al. | |
| 2005/0114829 A1 * | 5/2005 | Robin et al. | 717/101 |
| 2005/0114830 A1 * | 5/2005 | Knutson et al. | 717/102 |
| 2005/0120332 A1 * | 6/2005 | Martin et al. | 717/105 |
| 2006/0010418 A1 | 1/2006 | Gupta et al. | |
| 2006/0053043 A1 | 3/2006 | Clarke | |
| 2006/0235732 A1 | 10/2006 | Miller et al. | |
| 2007/0006161 A1 * | 1/2007 | Kuester et al. | 717/126 |
| 2007/0112945 A1 * | 5/2007 | Brown et al. | 709/223 |
| 2007/0179871 A1 | 8/2007 | Minor et al. | |

OTHER PUBLICATIONS

Lipner, Steve, Dec. 2004, The Trustworthy Computing Security Development Cycle, IEEE, Security Applications Conference, pp. 2-13.*

(Continued)

*Primary Examiner* — Jonathan G Sterrett
*Assistant Examiner* — Stephen S Swartz (57) ABSTRACT

A method of scheduling project milestones is provided. The method includes estimating a minimum duration of the project based on an estimated level-of-effort of the project. The method includes selecting a release cycle in which to deliver the project based on the minimum duration of the project, and further based on a release cycle milestone and on a duration of a project planning phase. The method provides for determining a project start date based on the duration of the project planning phase. The method also including scheduling each of a plurality of project milestones based on the release cycle milestone, the project start date, and a schedule of project phases as a percentage of total project duration. The schedule of project phases as a percentage of total project duration is derived from averages calculated from data collected from completed projects.

14 Claims, 3 Drawing Sheets

OTHER PUBLICATIONS

Pham, Hoang and Zhang, Xuemei, Jan. 1999, Software Cost Model with Warranty and Risk Costs, IEEE, IEEE Transactions on Computers, vol. 48, No. 1, pp. 71-75.*

Heires, James T., Sep./Oct. 2001, What I did Last Summer; A Software Development Benchmarking Case Study, IEEE Software, pp. 33-39.*

Musselman, Kenneth and O'Reilly, Jean and Duket Steven, Dec. 2002, The Role of Simulation in Advanced Planning and Scheduling, IEEE Simulation Conference 2002, vol. 2, pp. 1825-1830.*

Jandourek__Emil, 1996, A Model for Platform Development, HP Journal).*

Lipner__Steve, 2004, The Trustworthy Computing Security Development Lifecycle, Microsoft.*

Heires__James, 2001, What I did Last Summer, IEEE Software.*

Aoyama,__Mikio, 1998, Agile Software Process and its Experience, IEEE.*

Leffingwell, Dean and Muirhead, Dave, 2004, Tactical Management of Agile Development: Achieving Competitive Advantage, Rally Software Development.*

Rautianinen, Kristian, Lassenius Casper, Sulonen Reijo, 2002, 4CC: A Framework for Managing Software Product Development, Helsinki University of Technology, Engineering Management Journal, vol. 14, No. 2, pp. 27-32.*

Final Office Action dated Dec. 18, 2009, U.S. Appl. No. 11/403,701, filed Apr. 13, 2006, 16 pgs.

Knauth, Margaret J., et al., Patent Application entitled, "Predictive Growth Burn Rate in Development Pipeline," filed Apr. 13, 2006, U.S. Appl. No. 11/403,669, Specification (27 pgs.) and Drawings (3 sheets).

Knauth, Margaret J., et al., Patent Application entitled, "A Method and Software Tool for Real-Time Optioning in a Software Development Pipeline," filed Apr. 13, 2006, U.S. Appl. No. 11/403,773, Specification (32 pgs.) and Drawings (9 sheets).

Kanemoto, Michael W., et al., Patent Application entitled, "Hardware/Software and Vendor Labor Integration in Pipeline Management," filed Apr. 13, 2006, U.S. Appl. No. 11/403,652, Specification (30 pgs.) and Drawings (6 sheets).

Knauth, Margaret J., et al., Patent Application entitled, "Project Pipeline Management Systems and Methods Having Capital Expenditure/Expense Flip Targeting," filed Apr. 13, 2006, U.S. Appl. No. 11/403,701, Specification (31 pgs.) and Drawings (6 sheets).

Alsup, Lance A., et al., Patent Application entitled, "Project Estimator", filed Jul. 21, 2006, U.S. Appl. No. 11/491,203.

Deltek—Resource Planning and Project Budgeting Software for Professional Consultants: Wind 2, "Wind2 Resource Scheduling and Budgeting (RSB)," http://www.wind2.com/productsksb.asp, Oct. 12, 2005, Wind2 Software Inc., 8 pgs.

Office Action dated May 7, 2009, U.S. Appl. No. 11/195,964, filed Aug. 3, 2005, 14 pgs.

Office Action dated Jun. 9, 2009, U.S. Appl. No. 11/403,701, filed Apr. 13, 2006, 16 pgs.

Crum, James L., et al., "Spreading Algorithm for Work and Time Forecasting," filed Aug. 3, 2005, U.S. Appl. No. 11/195,964, Specification (25 pgs), Drawings (4 sheets).

Chapman, C., et al., "Constructively Simple Estimating: A Project Management Example," Oct. 2003, The Journal of the Operational Research Society, vol. 54, No. 10, p. 1052.

Office Action dated Oct. 30, 2009, U.S. Appl. No. 11/195,964, filed Aug. 3, 2005, 19 pgs.

Examiner's Answer dated Jan. 4, 2011, U.S. Appl. No. 11/195,964, filed Aug. 3, 2005.

Advisory Action dated Dec. 23, 2010, U.S. Appl. No. 11/403,652, filed Apr. 13, 2006.

Advisory Action dated Jan. 6, 2011, U.S. Appl. No. 11/491,203, filed Jul. 21, 2006.

Fox, Mark S., et al. "ISIS—a knowledge-based system for factory scheduling," Expert Systems, vol. 1, No. 1, Jul. 1984.

Final Office Action dated Feb. 9, 2011, U.S. Appl. No. 11/403,773, filed Apr. 13, 2006.

Office Action dated Mar. 29, 2010, U.S. Appl. No. 11/403,669, filed Apr. 13, 2006, 20 pgs.

Office Action dated Mar. 30, 2010, U.S. Appl. No. 11/403,652, filed Apr. 13, 2006, 26 pgs.

Chapman, C., et al., "Constructively Simple Estimating: A Project Management Example," Oct. 2003, The Journal of the Operational Research Society, vol. 54, No. 10, p. 1050-1058.

The Free Dictionary, Definition of Rate Equation, Reaction Rate, http://encyclopedia2.the freedictionary.com/Rate+equation+(chemistry) , 3 pages.

Final Office Action dated May 11, 2010, U.S. Appl. No. 11/195,964, filed Aug. 3, 2005, 39 pgs.

Armour, Phillip, "Ten Unmyths of Project Estimation," Communications of the ACM, Nov. 2002, vol. 45. No. 11, 4 pgs.

Office Action dated Jun. 8, 2010, U.S. Appl. No. 11/491,203, filed Jul. 21, 2006, 39 pgs.

Advisory Action dated Jul. 22, 2010, U.S. Appl. No. 11/195,964, filed Aug. 3, 2005, 3 pgs.

Dean, Burton V., et al., "Multiproject Staff Scheduling with Variable Resource Constraints," IEEE Transactions on Engineering Management, vol. 39, No. 1, Feb. 1992, pp. 59-72.

Pfahl, Dietmar, et al., "Integration of System Dynamics Modeling with Descriptive Process Modeling and Goal-Oriented Measurement," The Journal of Systems and Software vol. 46, 1999, pp. 135-150.

Powell, Anthony, et al., "Strategies for Lifecycle Concurrency and Iteration—A System Dynamics Approach," The Journal of Systems and Software, 1999, vol. 46, pp. 151-161.

Final Office Action dated Sep. 14, 2010, U.S. Appl. No. 11/403,669, filed Apr. 13, 2006, 22 pgs.

Office Action dated Aug. 19, 2010, U.S. Appl. No. 11/403,773, filed Apr. 13, 2006, 31 pgs.

Final Office Action dated Sep. 29, 2010, U.S. Appl. No. 11/403,652, filed Apr. 13, 2006.

Examiner's Answer dated Oct. 5, 2010, U.S. Appl. No. 11/403,701, filed Apr. 13, 2006.

Final Office Action dated Oct. 27, 2010, U.S. Appl. No. 11/491,203, filed Jul. 21, 2006.

Advisory Action dated Nov. 24, 2010, U.S. Appl. No. 11/403,669, filed Apr. 13, 2006.

Smith, Stephen F., et al., "Scheduling and Visualization," Final Technical Report AFRL-IF-RS-TR-2004-142, Jun. 2004, Carnegie Mellon University.

Final Office Action dated Apr. 27, 2011, U.S. Appl. No. 11/403,773, filed Apr. 13, 2006.

Advisory Action dated Jul. 19, 2011, U.S. Appl. No. 11/403,773, filed Apr. 13, 2006.

Office Action dated May 9, 2011, U.S. Appl. No. 11/403,652, filed Apr. 13, 2006.

Final Office Action dated Nov. 17, 2011, U.S. Appl. No. 11/403,652, filed Apr. 13, 2006.

Examiner's Answer dated Sep. 12, 2011, U.S. Appl. No. 11/491,203, filed Jul. 21, 2006.

Examiner's Answer dated Sep. 21, 2011, U.S. Appl. No. 11/491,203, filed Jul. 21, 2006.

Bott, M.F., "Software as a Corporate Asset" IEE Proc-Softw. vol. 147, No. 2, Apr. 2, 2000, 6pgs.

Lassila, Ora, et. al., "Toward the Development of Flexible Mixed-Initiative Scheduling Tools", Robotics Institute, Carnegie Mellow University, Mar. 15, 1994, 12 pgs.

Smith-Daniels, Dwight E., et al., "Heuristic Scheduling of Capital Constrained Projects", Journal of Operations Management 14, 1996, 14 pgs.

Ulusoy, Gündüz, et al., "A framework for an interactive project scheduling system under limited resources," European Journal of Operational Research 90, 1996, 14 pgs.

Office Action dated May 9, 2012, U.S. Appl. No. 11/403,773, filed Apr. 13, 2006.

* cited by examiner

MILESTONE INITIAL SCHEDULING

CROSS-REFERENCE TO RELATED APPLICATIONS

This application includes subject matter related to U.S. patent application Ser. No. 11/195,964, filed Aug. 3, 2005, entitled "Spreading Algorithm for Work and Time Forecasting," by James Crum, et al, which is incorporated herein for reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to software development project planning, and more particularly, but not by way of limitation, to a method and system for milestone initial scheduling.

BACKGROUND OF THE INVENTION

Development projects typically follow a process that is composed of a sequence of task phases. For example, software projects may begin with a requirements analysis phase, proceed to a design phase, proceed to a coding or implementation phase, proceed to a unit testing phase, proceed to an integration or system testing phase, proceed to a warranty phase, and finish in a maintenance phase. In different organizations, different phases may be identified and some phases may be added or omitted from the exemplary phases of the project lifecycle described above. The progress through the project phases need not be entirely sequential, and additional requirements analysis may be performed, for example, during later project phases or some coding may be performed, for example, during the design phase.

Evolving products may be released in a series of product release cycles. Some release cycles may be categorized as major release cycles and others may be categorized as minor release cycles. When software products evolve, multiple new or modified functions or behaviors may be delivered in a single release cycle. Some kinds of modifications may be required to be released in a major release cycle because of the magnitude of change they introduce or because they do not provide backwards compatibility.

Project planning is a challenging discipline that may involve planning the coordinated work of many people developing a new product. Many parameters interact in generating accurate estimates and plans. It is a common task in organizations to be asked to replan one or more projects based on a changed planning parameter, for example based on an earlier completion date, based on additional requirements, based on using outsourced personnel, based on sharing technology with another organization. Software tools can facilitate the task of planning and replanning projects.

SUMMARY OF THE INVENTION

According to one embodiment, method of scheduling project milestones is provided. The method includes estimating a minimum duration of the project based on an estimated level-of-effort of the project. The method includes selecting a release cycle in which to deliver the project based on the minimum duration of the project, and further based on a release cycle milestone and on a duration of a project planning phase. The method provides for determining a project start date based on the duration of the project planning phase. The method also including scheduling each of a plurality of project milestones based on the release cycle milestone, the project start date, and a schedule of project phases as a percentage of total project duration. The schedule of project phases as a percentage of total project duration is derived from averages calculated from data collected from completed projects.

In another embodiment, a project planning tool is provided. The tool includes a calculation component and a display component. The calculation component is operable to calculate a minimum project duration based on an estimate of total-hours-to-complete. The display component displays a representation of the project duration based on the minimum project duration aligned with a designated release cycle and further based on a common milestone and on a project planning phase of fixed duration extending from the present date. The display is further operable to display project phases based on a schedule of duration of each project phase as a percentage of the project duration.

A method of scheduling software project milestones is also provided according to still another embodiment of the present disclosure. The method includes estimating a minimum software project duration based on a software project size. The method includes selecting a software release cycle from a plurality of software release cycles, based at least on the minimum software project duration. The method includes scheduling a plurality of milestones of the software project based on a code drop date milestone scheduled by the selected software release cycle. The plurality of milestones is further based on a fixed duration software project planning phase and on a schedule of software project phase durations. The duration of each software project phase is defined as a percentage of total software project duration based on analysis of data from completed software projects.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

A method and tool for scheduling project milestones is provided below. The method determines a minimum project duration based on an estimate of how many working hours are to be expended completing the project from start to finish. In the present embodiment, the project is a computer software development project, such as for an enterprise software application. This estimate of working hours may be called a level-of-effort (LOE) estimate. The method then compares the minimum project duration with a plurality of project release cycles to identify which release cycles the subject project may fit into. In the present embodiment, the term release or release cycle(s) refers to a scheduled event when other software systems or applications that have been developed and are scheduled for deployment on the enterprise computer system or to customers as new software or as new releases or updates of existing software. The system managers schedule predetermined times, such as at certain intervals, i.e. monthly or quarterly, at which time the enterprise will allocate resources to deploy and/or will permit new or updated software to be put into operation on the enterprise systems.

For example, if a critical milestone is thirty days in the future for a first release cycle but the equivalent milestone is not projected to be achieved in the subject project for one hundred and twenty days, the subject project does not fit into the first release cycle. Alternatively, if the critical milestone is two hundred days in the future for a second release cycle, the subject project may fit into the second release cycle. After identifying an appropriate release cycle for the subject project, a start date is determined for the subject project. With the critical milestone date set by the selected release cycle and the start date determined, the remainder of the milestones delimiting project phases are determined based on a phase duration schedule that defines the duration of each project phase as a percentage of the total project duration.

Figure 1:
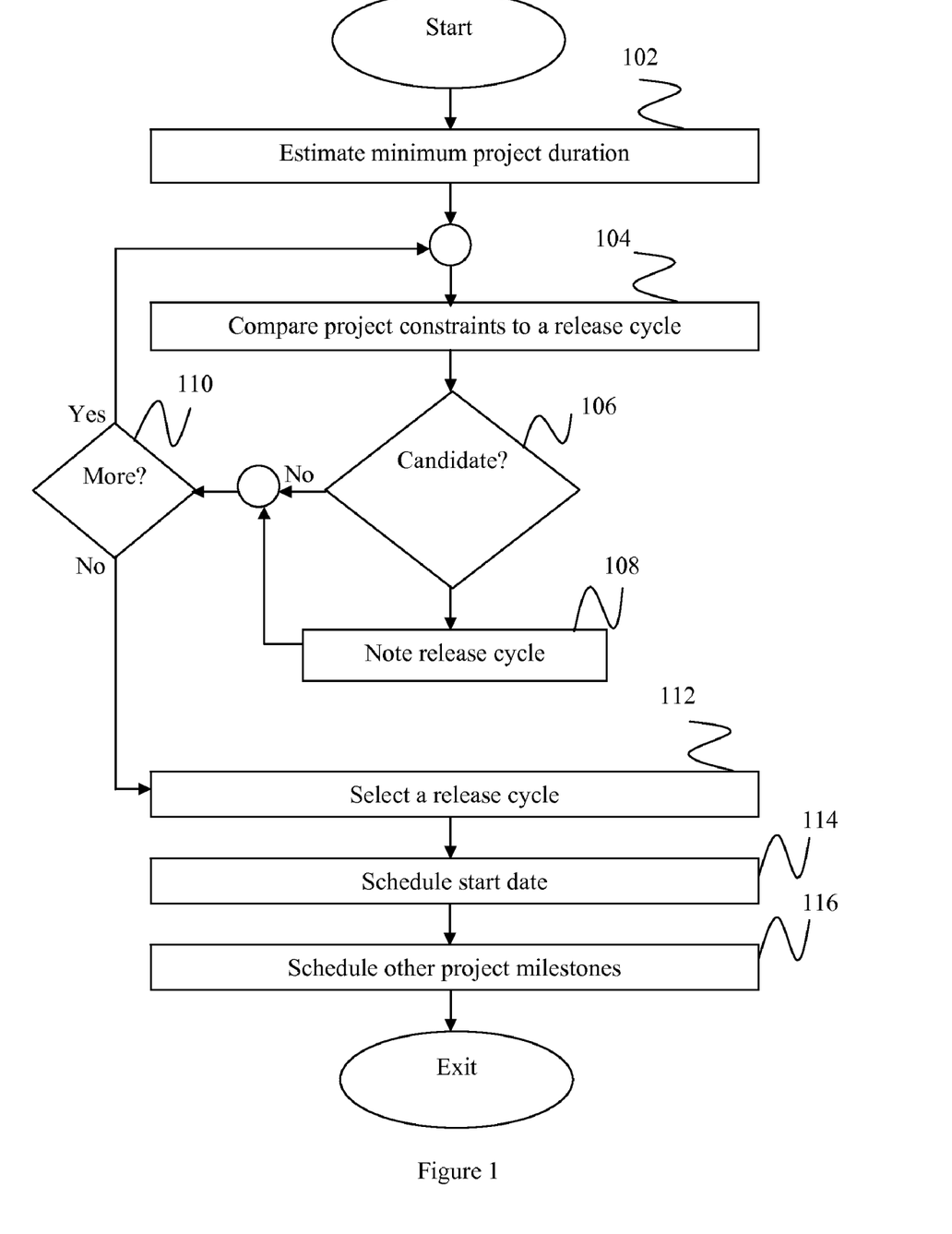
FIG. 1 is a logic flow diagram of a process according to an embodiment of the present disclosure.

Turning now to FIG. 1, a logic flow diagram of a process 100 for scheduling project milestones is depicted. The process 100 may be practiced as a manual process or as an automated process. The process 100 begins in block 102 where a minimum project duration is estimated. The minimum project duration estimate is based on a preliminary estimate of project size, for example based on an estimate of the level-of-effort the project will consume. The minimum project duration estimate may include a prudent safety factor that increases the minimum project duration estimate by a percentage, for example fifteen percent, or by a fixed duration, for example two weeks. The minimum project duration estimate may also be rounded up, for example rounded up from a fractional number of months to the next highest integer number of months.

The process 100 proceeds to block 104 where the time constraints of the project are determined and compared to a specific release cycle. In some organizations additional planning activities may be conducted between the time that the process 100 is performed and the work on the project begins. In an embodiment, the planning activity may include a feasibility and estimation analysis, a management commitment meeting, and a resource gathering period. In an embodiment, the feasibility and estimation analysis may take a time period of two weeks, three weeks, or four weeks to complete, depending on the project. To accommodate the longest duration feasibility and estimation analysis period, four weeks of the planning activity may be allocated for feasibility and estimation analysis. In an embodiment, a management team meets every two weeks to decide on project commitments, and two weeks of the planning activity are allocated to obtain management commitment. Once a project is committed to by management, project resources must be obtained and tooling assembled. For a software project, the resource gathering period may involve an outsourcer interviewing and bringing on-board appropriately skilled personnel to work the project. Resource gathering may also involve acquiring work stations, configuring networks, installing servers, and obtaining software tools to use in performing the work. In an embodiment, thirty days are allocated for resource gathering. In an embodiment, a total of ninety days are allocated for the planning activity. In another embodiment, however, there may be no planning activity that precedes the start of the project.

The time constraints of the project are based on the minimum project duration and on the planning duration. In an embodiment, the time constraint is calculated as the sum of the minimum project duration added to the planning duration. In another embodiment, the time constraint is calculated based on a critical milestone, other than the end of the project, for example a code drop date. The code drop date for a release cycle is the date on which code from projects must be delivered to be included in the release cycle. The code drop date may occur, for example, at a point when sixty percent of the project duration has passed. In this case, the project time constrain is determined as the time estimated to progress from the project start date to the code drop date, for example sixty percent of the minimum project duration, plus the planning duration. A time remaining is determined from the present date until the end date of the specific release cycle and compared to the time constraint of the project. If the time constraint of the project is equal or less than the time remaining of the specific release cycle, the specific release cycle is considered a candidate release cycle.

The process 100 proceeds to block 106 where if the specific release cycle is a candidate the process proceeds to block 108 where the candidate release cycle is noted, for example written in a notebook or stored in a data store. The process 100 proceeds to block 110 where if more specific release cycles remain to be compared to the project constraints, the process 100 returns to block 104. When no additional specific release cycles remain to be compared, the process 100 proceeds to block 112.

In block 112 a candidate release cycle is selected to include the project. If more than one candidate release cycle is identified, the selection may be based on considerations of what is the earliest candidate release cycle. In some cases, for example a major software project, the project may preferably be included in a major candidate release cycle. In other cases, for example a minor software project, the project may be included in either a major or minor candidate release cycle.

In another embodiment, in block 104 an additional constraint may be that a project be released in a specific type of release, for example in a major release. In this case, the subject release cycle must satisfy the time constraints as well as the release type constraints of the project. The release cycles may be compared to the project constraints in time order, and when a release cycle is found that satisfies both time constraints and release type constraints, this release cycle is selected and the process flows directly to block 114.

The process 100 proceeds to block 114 where a start date is scheduled for the project. In many cases, the start date may be scheduled as the earliest date possible after completion of the planning phase. The critical milestone of the project will coincide with the schedule date of the critical milestone for the selected release cycle, for example an end date or a code drop date.

The process proceeds to block 116 where the remaining project milestones are scheduled based on a schedule or table of typical duration of project phases, where the typical durations are expressed as a percentage of total project duration. The milestone events may be named as the end of the project phase whose termination they mark. For example, requirements analysis may consume twenty-five percent of project duration, design may consume twenty percent of project duration, coding may consume fifteen percent of project duration, testing may consume twenty percent of project duration, and a warranty period may consume the remaining twenty percent of project duration.

In an exemplary first project, the duration from start to end is one hundred days, and then the duration of requirements analysis is projected to be twenty-five days, design twenty days, coding fifteen days, testing twenty days, and warranty period twenty days. The milestone schedule for the first project then would include project start on day zero, requirements analysis complete day twenty-five, design complete day forty-five, coding complete day sixty, testing complete day eighty, and project complete day one hundred.

In an exemplary second project, code drop occurs at the completion of coding and is the critical milestone. In the second project, the time between start and code drop is one hundred days, and the duration of the first project from start to end can be calculated as one hundred sixty-seven days. Employing the same typical project phase duration schedule described above, the duration of requirements analysis is projected to be forty-two days, design thirty-three days, coding twenty-five days, testing thirty-four days, and warranty period thirty-three days. The milestone schedule for the second project then would include project start on day zero, requirements analysis complete day forty-two, design complete day seventy-five, coding complete day one hundred, testing complete day one hundred thirty-four, and project complete day one hundred sixty-seven. The above two milestone schedules are understood to be exemplary. In other embodiments, other milestone schedules are contemplated.

The schedule of duration of project phases may be derived from analysis of historical data from completed projects. In an embodiment, the historical data is selected from a recent period of time to assure that the organizational processes employed at the time of the historical data conforms with current practice, for example data from projects completed over the most recent six months. In an embodiment, the warranty phase is a fixed duration, for example thirty days, and in this case the schedule of phase durations represents the duration of each project phase as the percentage of project duration minus the warranty duration.

In an exemplary third project, consideration of the anticipated level-of-effort of the project is one hundred days and code drop is projected to occur 60 days after the start of the project. The third project cannot be released as part of a minor release but must be released with a major release. In this example, the planning phase is not part of the time constraint. In examining release cycles for an appropriate fit, the first considered release cycle is a minor release and it is rejected because the third project cannot be released as part of a minor release. The second considered release cycle is a major release and has a code drop date that is 50 days after the date of the analysis is performed and is rejected because the third project cannot achieve this code drop date. The third considered release cycle is a minor release and is rejected. The fourth considered release cycle is a major release and has a code drop date that is 100 days in the future, so the fourth considered release cycle is selected. The milestones of the third project may be projected based on the description above.

In a fourth project, consideration of the anticipated level-of-effort of the project is one hundred days and code drop is projected to occur 60 days after the start of the project. In this example, the planning phase is projected to consume 90 days after the completion of the release cycle selection and initial milestone selection. Therefore, the code drop date for the fourth project can occur no earlier than 160 days in the future. The first through fourth release cycles considered above are rejected because the fourth project cannot meet their code drop date constraints. A fifth release cycle has a code drop date 180 days in the future and is selected as the appropriate release cycle. The milestones of the fourth project may be projected based on the description above.

Figure 2:
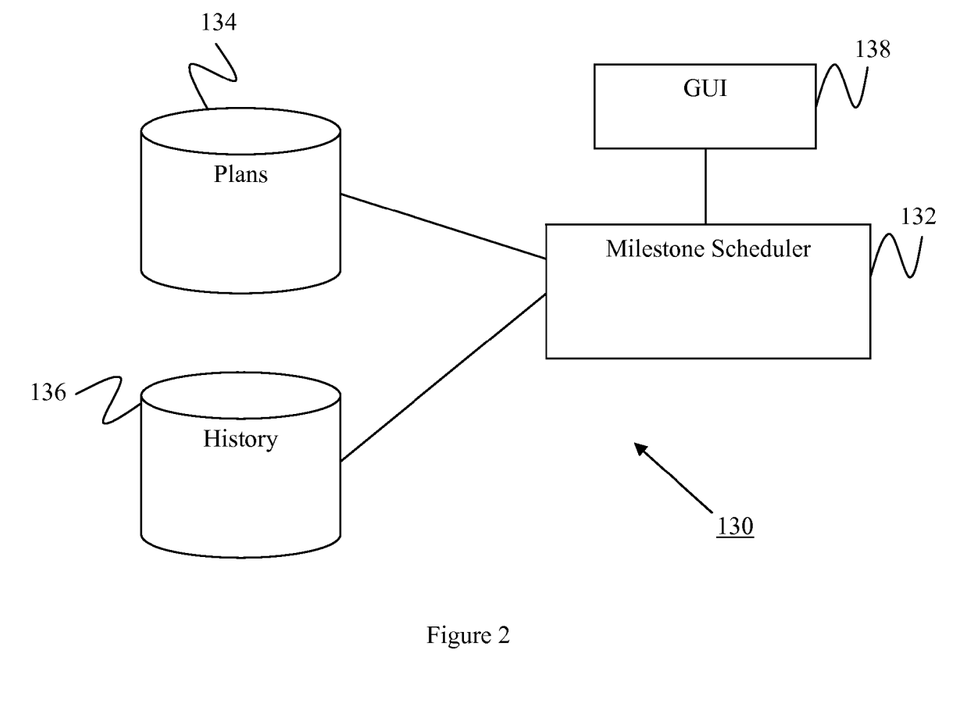
FIG. 2 is a block diagram of a software tool according to an embodiment of the present disclosure.

Turning now to FIG. 2, a system 130 for automating the process 100 is depicted. In an embodiment, the system 130 comprises a milestone scheduler component 132, a project planning data store 134, a project history data store 136, and a graphical user interface (GUI) 138. The system 134 may be implemented on a general purpose computer system. General purpose computer systems are discussed in detail hereinafter.

The project planning data store 134 includes planning information associated with a plurality of projects and release cycles. The planning information may include code drop dates, completion dates, and/or other critical milestone schedule date for release cycles and may identify release cycles as either minor or major release cycles. The planning information may include level-of-effort estimates for one or more projects. The planning information may include one or more project phase duration schedules which indicate the duration of each project phase as a percentage of total project duration. The planning information may include scheduled project milestone dates, for example project milestone dates generated by the milestone scheduler component 132. Additional planning information may be stored in the project planning data store 134, for example information generated during the planning activity described above. The additional planning information may be generated by a different software tool.

The project history data store 136 contains data on project phase durations and total project durations for completed projects. This information may be employed by the milestone scheduler component 132 to determine averages to be used to generate project phase duration schedules.

In an embodiment, the milestone scheduler component 132 is a software component or program operable to perform or control the process 100 described above with reference to FIG. 1. The milestone scheduler component 132 is in communication with the project planning data store 134 and the project history data store 136. Under control of user inputs to the GUI 138, the milestone scheduler component 132 leads the user through the process of selecting an appropriate release cycle, an appropriate critical milestone, and a project start date. The milestone scheduler component 132 then automatically generates the project milestone schedule and stores the project milestone schedule in the project planning data store 134. In an embodiment, the milestone scheduler component 132 is operable to generate a report representing the project milestone schedule. The report may be distributed as an electronic file, for example as a spreadsheet that may be attached to an email and emailed to interested personnel, or may be printed. In an embodiment, the milestone scheduler component 132 may be integrated as a function or component of a more comprehensive project planning and management tool.

Figure 3:
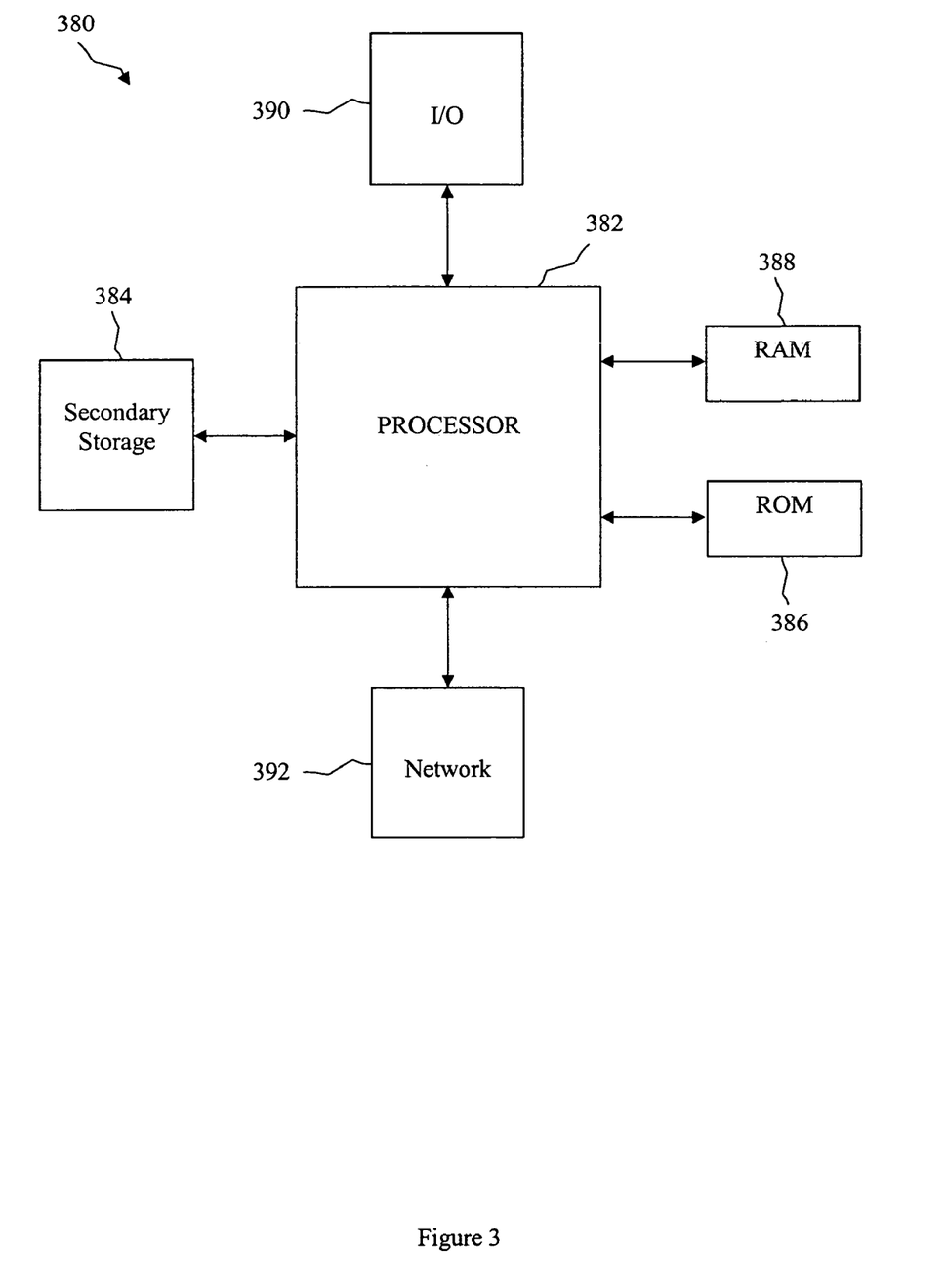
FIG. 3 illustrates an exemplary general purpose computer system suitable for implementing the several embodiments of the disclosure.

The system 130 described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method of scheduling software development project milestones, comprising:

operating a calculation component stored on a computer readable storage medium and executed by a processor to estimate a minimum duration of a software development project based on an estimated level-of-effort of the software development project, wherein the minimum duration of the software development project includes a safety factor that increases the minimum duration of the software development project by a percentage or a fixed duration, wherein the minimum duration of the software development project is rounded up to a next highest integer amount when the minimum duration of the software development project is a non-integer amount, and wherein the estimated level-of-effort of the software development project is an estimate of a number of hours that are to be expended to complete the software development project from start to finish;

operating a milestone scheduler component stored on a computer readable storage medium and executed by a processor to determine a time constraint of the software development project, wherein the time constraint comprises a relative portion of the minimum duration of the software development project to pass until a code drop date of the software development project is projected to occur plus a duration of a planning phase of the software development project;

operating the milestone scheduler component to compare the time constraint of the software development project with a plurality of pre-established software release cycles to identify a candidate pre-established software release cycle within which the software development project will fit, wherein the time constraint of the software development project is less than or equal to a time remaining until a code drop date of the candidate pre-established software release cycle, wherein each of the plurality of pre-established software release cycles are scheduled at a predetermined time and comprise a plurality of pre-scheduled milestones, including a code drop milestone at a preset calendar date, and wherein a type of software release cycle of the candidate pre-established software release cycle is a major type of software release cycle or a minor type of software release cycle;

operating the milestone scheduler component to select the candidate pre-established software release cycle as a selected pre-established software release cycle in which to release the software development project, based on a constraint on a type of release cycle in which the software development project is released and the type of software release cycle of the candidate pre-established software release cycle;

operating the milestone scheduler to set the code drop date of the software development project to be coincident with the code drop date of the selected pre-established software release cycle;

operating the milestone scheduler to schedule a start date of the software development project to be on a date proximately subsequent to completion of the planning phase of the software development project; and operating the milestone scheduler component, with the code drop date of the software development project set by the selected pre-established software release cycle and the start date of the software development project scheduled, to schedule each of a plurality of additional project milestones that delimit phases of the software development project based on a phase duration schedule that defines the duration of each of the phases of the software development project as a percentage of total project duration of the software development project, wherein the phase duration schedule is derived from averages calculated from data collected from completed projects, and wherein the phases of the software development project are selected from the group consisting of requirements analysis, design, development, test, deployment, and warranty.

2. The method of claim 1, wherein the start date is scheduled to occur at the earliest date after completion of the software development project planning phase, the project planning phase having a fixed time duration.

3. The method of claim 1 wherein the project planning phase includes a feasibility and estimating portion, a management commitment portion, and a project set-up portion.

4. The method of claim 3 wherein the duration of the project set-up portion is based on an agreement with an outsourcer.

5. The method of claim 1, wherein the phase duration schedule is derived from averages calculated from data collected from projects completed during the most recent six months.

6. A project planning tool, comprising:
a calculation component stored on a computer readable medium and executable by a processor to calculate a minimum project duration of a project based on an estimate of total-hours-to-complete the project, wherein the minimum duration of the project includes a safety factor that increases the minimum duration of the project by a percentage or a fixed duration, and wherein the minimum duration of the project is rounded up to a next highest integer amount when the minimum duration of the project is a non-integer amount;

a project planning data store stored on a computer readable medium and executable by a processor to maintain planning information associated with the project and to maintain planning information associated with a plurality of pre-established release cycles, wherein the planning information associated with the plurality of pre-established release cycles comprises preset calendar dates for a plurality of milestones of each of the plurality of pre-established release cycles, including a preset calendar date for a critical milestone of each of the plurality of pre-established release cycles;

a project history data store stored on a computer readable medium and executable by a processor to maintain data related to project phase durations and total project durations for completed projects;

a milestone scheduler component stored on a computer readable medium and executable by a processor to communicate with the project planning data store and the project history data store to select one of the plurality of pre-established release cycles within which to release the project, to set a critical milestone date for the project to be coincident with the preset calendar date for the critical milestone of the selected one of the plurality of pre-established release cycles, and to schedule a project start date for the project to be on a date proximately subsequent to completion of a planning phase of the project that has a fixed duration and extends from the present date;

the milestone scheduler component further executable to determine a time constraint of the project, wherein the time constraint comprises a relative portion of the minimum project duration to pass until the critical milestone date of the project is projected to occur plus a duration of the planning phase of the project;

the milestone scheduler component further executable to compare the time constraint of the project with the plurality of pre-established release cycles to identify the selected one of the plurality of pre-established release cycles as a candidate pre-established release cycle within which the project will fit, wherein the time constraint of the project is less than or equal to a time remaining from the present date until the preset calendar date for the critical milestone of the candidate pre-established release cycle, wherein a type of release cycle of the candidate pre-established release cycle is a major type of release cycle or a minor type of release cycle, wherein the one of the plurality of pre-established release cycles is selected based on a constraint on a type of release cycle in which the project is released and the type of release cycle of the candidate pre-established release cycle;

the milestone scheduler component further executable, with the critical milestone date for the project set by the selected one of the pre-established release cycle and the start date for the project scheduled, to schedule each of a plurality of additional project milestones that delimit phases of the project based on a phase duration schedule that defines the duration of each of the phases of the project as a percentage of total project duration, wherein the phase duration schedule is derived from averages calculated from the data related to project phase durations and total project durations for completed projects, and wherein the phases of the software development project are selected from the group consisting of requirements analysis, design, development, test, deployment, and warranty; and a display component stored on a computer readable medium and executable by a processor to display a representation of the project duration based on the minimum project duration being able to fit within the selected one of the pre-established release cycles and further based on the critical milestone being shared between the project and the selected one of the pre-established release cycles and on the start date for the project scheduled based on the planning phase of the project that has a fixed duration and extends from the present date, the display component further operable to display the phases of the project based on the phase duration schedule.

7. The project planning tool of claim 6, wherein the project planning phase has a fixed duration in the range of fifty days to ninety days.

8. The project planning tool of claim 6, wherein the critical milestone date is a code drop date.

9. The project planning tool of claim 6, wherein the duration of the warranty project phase is a fixed duration.

10. The project planning tool of claim 6, wherein the representation of the project duration is fitted between the critical milestone and the end of the project planning phase.

11. The project planning tool of claim 6, wherein the phase duration schedule is determined based on average percentage of project time consumed in each project phase in completed projects.

12. A method of scheduling software project milestones, comprising:

operating a calculation component stored on a computer readable storage medium and executed by a processor to estimate a minimum software project duration based on a software project size measured as an amount of effort that is to be expended to complete the software project from start to finish, wherein the minimum duration of the software project includes a safety factor that increases the minimum duration of the software project by a percentage or a fixed duration, and wherein the minimum duration of the software project is rounded up to a next highest integer amount when the minimum duration of the software project is a non-integer amount;

operating a milestone scheduler component stored on a computer readable storage medium and executed by a processor to determine a time constraint of the software project, wherein the time constraint comprises a relative portion of the minimum software project duration to pass until a critical milestone date of the software project is projected to occur plus a fixed duration of a planning phase of the software project;

operating the milestone scheduler component to compare the time constraint of the software project with a plurality of pre-established software release cycles to identify a candidate pre-established software release cycle within which the software project will fit, wherein the time constraint of the software project is less than or equal to a time remaining until a critical milestone date of the candidate pre-established software release cycle, wherein each of the plurality of pre-established software release cycles are scheduled at a predetermined time and comprise a plurality of pre-scheduled milestones, including a code drop milestone at a preset calendar date, and wherein a type of software release cycle of the candidate pre-established software release cycle is a major type of software release cycle or a minor type of software release cycle;

operating the milestone scheduler component to select the candidate pre-established software release cycle as a selected pre-established software release cycle in which to release the software project, based on a constraint on a type of release cycle in which the software development project is released and the type of software release cycle of the candidate pre-established software release cycle;

operating the milestone scheduler component to set the critical milestone date of the software project to be coincident with the critical milestone date of the selected pre-established software release cycle;

operating the milestone scheduler to schedule a start date of the software project to be on a date proximately subsequent to completion of the planning phase of the software project; and operating the milestone scheduler component, with the code drop date of the software project set by the selected pre-established software release cycle and the start date of the software project scheduled, to schedule a plurality of additional milestones that delimit phases of the software project based on a critical milestone of the selected established software release cycle, the phase duration schedule that defines the duration of each of the phases of the software project as a percentage of total project duration of the software project, wherein the phase duration schedule is derived from averages calculated from data collected from completed software projects, and wherein a type of software release cycle of the candidate pre-established software release cycle is a major type of software release cycle or a minor type of software release cycle.

13. The method of claim 12, wherein the critical milestone is a code drop milestone and wherein the code drop milestone of the software project is estimated to occur a number of days after project start that is equal to 60% of the minimum software project duration.

14. The method of claim 12, wherein the data from completed projects is selected from projects that are less than six months old.

* * * * *